United States Patent [19]

Bhattacharjee et al.

[11] Patent Number: 4,906,708

[45] Date of Patent: Mar. 6, 1990

[54] PROCESS FOR INCREASING THE MELT VISCOSITY AND/OR MELT ELASTICITY OF POLYAMIDES WITH ARYL PHOSPHORYL AZIDE

[75] Inventors: Himangshu R. Bhattacharjee, Randolph; Yash P. Khanna, Cedar Knolls, both of N.J.

[73] Assignee: Allied-Signal Inc., Morris Township, Morris County, N.J.

[21] Appl. No.: 266,612

[22] Filed: Nov. 3, 1988

[51] Int. Cl.$^4$ .............................................. C08G 69/48
[52] U.S. Cl. .................................... 525/420; 524/136; 525/419; 528/487
[58] Field of Search ................. 525/420, 419; 528/487

[56] References Cited

U.S. PATENT DOCUMENTS

| | | | |
|---|---|---|---|
| 3,509,107 | 4/1970 | Brignac | 260/78 |
| 3,551,548 | 12/1970 | Brignac et al. | 264/234 |
| 3,763,113 | 10/1973 | Barrows et al. | 260/78 SC |
| 4,390,667 | 6/1983 | Aharoni et al. | 525/420 |
| 4,417,031 | 11/1983 | Aharonie et al. | 525/425 |
| 4,417,032 | 11/1983 | Khanna et al. | 525/432 |

FOREIGN PATENT DOCUMENTS 569184 5/1945 United Kingdom .

OTHER PUBLICATIONS

Nishi Noro et al., "Polymerization of Amino-acids or Peptides with Diphenyl Phosphoryl Azide (DPPA)", *Int. J. Biol. Macromol.*, vol. 2, p. 53, 1980.

Shiori, Takayuki, "Doiphenylphosphoryl Azide, A New Convenient Reagent for a Modified Curtius Reaction and for the Peptide Synthesis", *J. of the American Chemical Society*, vol. 94, pp. 6203–6205, (1972).

*Primary Examiner*—Harold D. Anderson
*Attorney, Agent, or Firm*—Richard C. Stewart; Gerhard H. Fuchs

[57] ABSTRACT

A process for decreasing the melt index and increasing the melt viscosity and melt elasticity of polyamide by adding thereto an effective amount of an aryl phosphoryl azide compound as for example diphenyl phosphoryl azide, and thereafter heating the composition until the desired changes in melt index, melt viscosity and melt elasticity are attained.

19 Claims, 1 Drawing Sheet

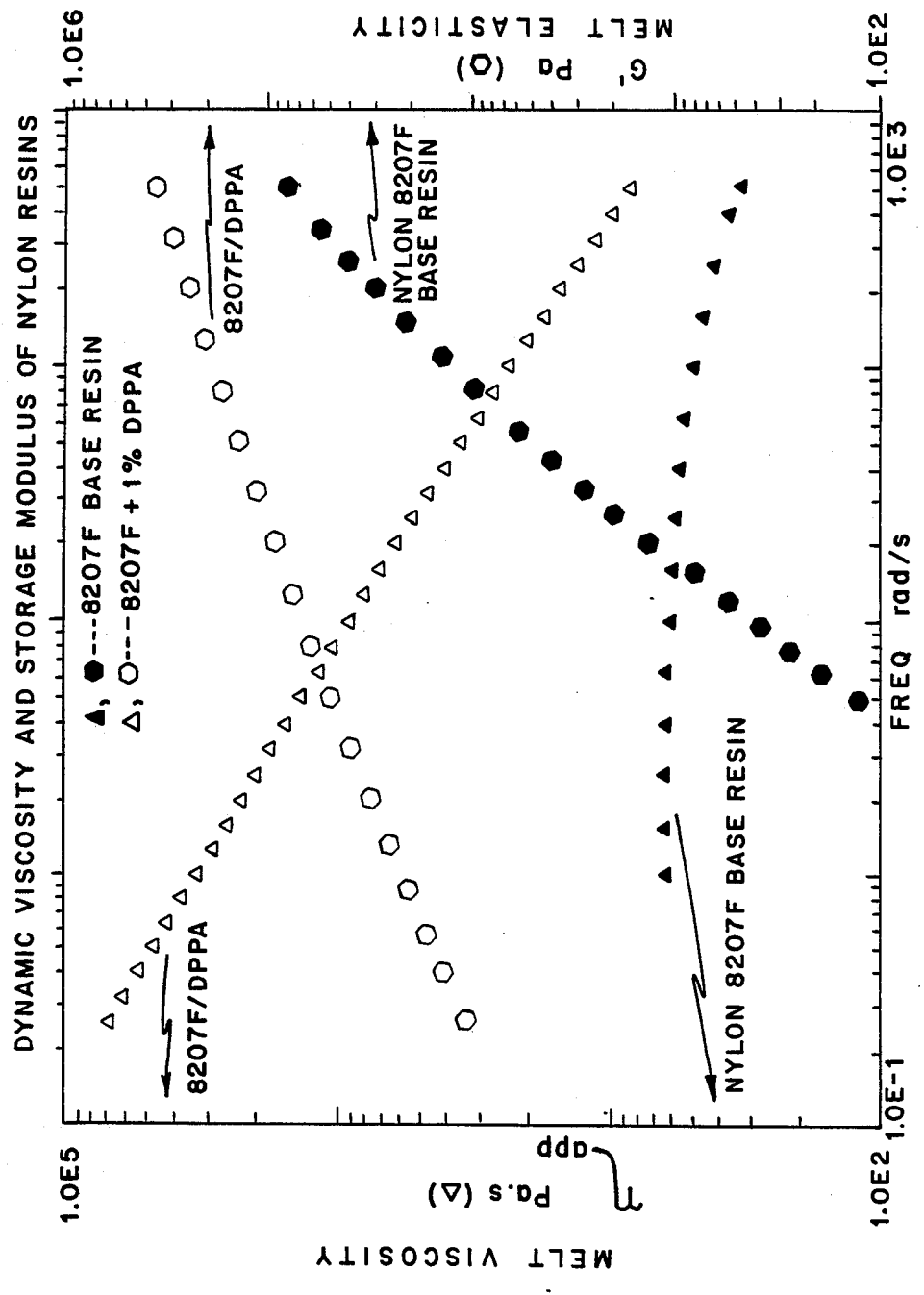

PROCESS FOR INCREASING THE MELT VISCOSITY AND/OR MELT ELASTICITY OF POLYAMIDES WITH ARYL PHOSPHORYL AZIDE

BACKGROUND OF THE INVENTION

1. Field of the Invention

This invention relates to a process for decreasing the melt index and increasing the melt viscosity and melt elastically of polyamide compositions. More particularly, this invention relates to such a process in which the increase in melt elasticity and/or melt viscosity is effectuated by the addition of an effective amount of an aryl phosphoryl azide compound. Polyamide compositions treated in accordance with the process of this invention are capable of being fabricated into useful shaped articles of manufacture, e.g., filaments, both mono- and multifilament, films, tapes, ribbons, rods, laminates, and the like.

2. Description of the Prior Art

Polyamide compositions are disclosed in the prior art as having many and varied uses in industrial and commercial applications. For example, these polymers can be formed in filaments in which the polymer chains are oriented along the filament axis. Such filaments have many uses, in commercial application as for example in the production of fibers for tire cord, textiles and the like. Similarly, these polymers can be fabricated into other useful shaped articles, as for example, gears, lawn mower housings, skate boards and the like.

The melt index of polyamide compositions provides an indication of the viscosity of the polyamides, and their molecular weights. In general, polymers having low melt indexes are desirable because of improved properties of fibers and other shaped articles made therefrom. For example, fibers made from polymers of relatively low melt indexes have increased tensile strength, durability and impact resistance. These properties are very desirable, especially in fibers used as reinforcement for pneumatic automobile tires.

Several processes have been proposed in the prior art for increasing the viscosity and molecular weight of polyamides, as for example poly(hexamethylene adipamide). One such method is set forth in U.S Pat. No. 3,763,113 which discloses a method for increasing the molecular weight of polyamides having recurring -CONH-alkylene-NHCO-alkylene units, such as poly(-hexamethylene adipamide) by heating the polyamide with a phosphonic acid derivative in the presence of an inert gas, such as nitrogen. Similarly, U.S. Pat. Nos. 3,551,548 and 3,763,113, each broadly describes a method for increasing the relative viscosity of polyamides, generally, and poly(hexylmethyleneadipamide), specifically, by sweeping a molten mixture of the polyamide and phosphorous compound with an inert gas.

Each of these processes provides various adverse effects. For example, in each of the processes an inert gas is employed, which in high concentrations cause uneven finishing, i.e. a variation in the degree of polymerization, throughout the polyamide, which results in a non-uniform polymer. Furthermore, inert gas is expensive, and require additional equipment and monitoring which can increase the cost of commercialization of the process, even though the inert gas is used in small amounts.

U.S. Pat. No. 4,417,032 discloses a process for forming quasi-random copolymers from two or more homo polyamides. In this process, the homo polyamides are melt blended in the presence of a phosphite promoter.

U.S. Pat. No. 3,509,107 discloses a process for increasing the relative viscosity of polyamide fibers or copolyamides by incorporating a phosphorous or phosphite compound into the polyamide under an inert gas atmosphere. The primary object of U.S. Pat. No. 3,509,107 is to provide a process for increasing the viscosity of polyamide yarn and cord which requires a minimum amount of gas. U.S. Pat. No. 3,551,548 (Brignac et al., 1970) describes various optimizing procedures for U.S. Pat. No. 3,509,107. The described patents are each directed only to a method of producing polyamide yarn with increased viscosity via incorporating a phosphorous or phosphite compound into the yarn, and then heating said yarn in the presence of inert gas.

British Patent No. 569,184 discloses a method for producing a random copolymer from nylon 6 and nylon 6,6. The invention described herein teaches that heating a mixture of nylon 6 and nylon 6,6 results in interchange between various sections of the respective polymer molecules with the final product being a random copolymer of nylon 6 and nylon 6,6. In order to produce a random copolymer of nylon 6 and nylon 6,6,British Patent No. 569,184 teaches that it is necessary to heat the mixture of homopolymers for periods of time up to 8 hr. at 285° C. without any catalyst.

U.S. Pat. No. 4,390,667 discloses a process for decreasing the melt index and increasing the viscosity of polyamide fibers via incorporating a phosphate compound into the polyamide and heating the polylamide until the desired changes in the melt index and viscosity occur. The phosphate utilized in U.S. Pat. No. 4,390,667 include substituted aryl phosphates which satisfy certain Hammett sigma values U.S. patent application Ser. No. 280,563 now abandoned teaches that polymers of caprolactam with increased viscosity may be produced by reacting in the melt a phosphite compound and a caprolactam polymer.

U.S. Pat. No. 4,417,031 discloses a process for preparing block and graft copolymers. The described process involves reacting two or more polyamides, polyesters, and homopolymers of $\beta$-unsaturated carboxylic acids in order to form a graft and/or block copolymer. Included in the patent are copolymers formed from poly(caproamide) and poly(hexamethylene adipamide).

Diphenyl phosphoryl azide has been used as a convenient reagent for racemization-free peptide synthesis and for polymerization of peptides such as $\beta$-alanine and L-alanylglycine. See for example, Nishi Nori et al. "Polymerization of Amino-acids or Peptides with Diphenyl Phosphoryl Azide (DPPA)", *Int. J. Biol-Macromol.*, Vol. 2 pp. 53 (1980) and Shiori Takayuki et al., "Diphenylphosphoryl Azide. A New Convenient Reagent For A Modified Curtius Reaction and for the Peptide Synthesis", *J. of The American Chemical Society*, Vol. 94 pp. 6203–6205 (1972).

BRIEF DESCRIPTION OF THE INVENTION

In accordance with this invention, there is provided a process for decreasing the melt index and increasing the melt elasticity and melt viscosity of polyamides which comprises the steps of:

forming an intimate mixture of a polyamide, and an effective amount of one or more aryl phosphoryl azide compounds of the formula:

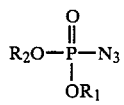

wherein:

$R_1$ is selected from the group consisting of phenyl or phenyl substituted with one or more substituents such as alkyl, alkoxy, phenoxy, phenyl, alkoxyalkyl, alkylphenyl, alkoxyphenyl, phenylalkyl, nitro, halo, sulfite and the like which are inert under process conditions; and $R_2$ is selected from the group consisting of $R_1$ substituents, alkyl, haloalkyl, hydrogen and metal and nonmetal cations; and (b) heating said mixture for a time and at a temperature such that the melt index of said mixture becomes less than the melt index of said polyamides and the melt viscosity and melt elasticity of said mixture is greater than the melt viscosity and melt elasticity of said polyamides.

As used herein, "an effective amount" is an amount of the aryl phosphoryl azide compound which is effective to cause the decrease in melt index and the increase in melt viscosity and melt elasticity.

As used herein, "melt index" denotes a particular combination of test conditions for measuring rate of extrusion of the polyamide through an orifice of a specified length and diameter. The equipment is called a melt indexer because it permits the indexing or classification of melted resins according to an agreed upon convention. The device has been adopted and standardized as an ASTM Tentative Method of Measuring Flow Rates of Thermoplastics by Extrusion Plastometer (D 1238), ISO Recommendation and the Determination of the Index of Fluidity of Polyethylene Compounds (R 317), British Standards BS 1972 and BS 2782 Method 105C, and Government Department Electrical Specification No. 27, 1950 Great Britain. Manufacturers of melt index equipment meeting the ASTM requirements are: Appalachain Electronics, Inc., Ronceverte, W. Va.; F. F. Slocomb Corporation, Wilmington, Del.; Tinius Olson Testing Machine Company, Willow Grove, Pa; and W. J. Hacker and Company, Inc. West Caldwell, N.J.

As used herein, "melt viscosity" denotes the internal friction, i.e. fluidity of the polyamide, and is well known in the art. A wide variety of viscometers is available for measurement of viscosity, such as capillary, rotational, orifice, falling ball, and oscillatory types. They are described in Barr, "A Monograph of Viscometry," Oxford, N.Y. (1931) and Kirk and Othmer, "Encyclopedia of Chemical Technology," Vol. 14, pp. 756–775 the Interscience Encyclopedia, Inc., New York (1955).

As used herein, "melt elasticity" is the degree to which a polymer melt recovers from a strain. Melt elasticity is described in greater detail in C. D. Han, "Rheology in Polymer Processing", Academic Press, New York, N.Y. (1976).

BRIEF DESCRIPTION OF THE DRAWINGS

FIG. 1 is a graph showing change in melt viscosity and melt elasticity as a function of shear rate.

DETAILED DESCRIPTION OF THE INVENTION

The process of this invention is conveniently carried out in two steps. The first step of the process consists of forming an intimate mixture of an appropriate polyamide and an aryl phosphoryl azide of the formula:

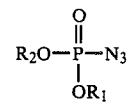

wherein $R_1$ and $R_2$ are as defined above. In the second step of the process, the intimate mixture is heated In a preferred embodiment of this invention, a molten mixture is formed in the first process step. As used herein, "molten mixture" is a intimate mixture which has been heated to a temperature which is equal to or greater than the melting point of the polyamide component of the mixture. The manner in which the molten mixture is formed is not critical and conventional methods can be employed. For example, the molten mixture can be formed through use of conventional polymer and additive blending means, in which the polyamide component is heated to a temperature equal to or greater than the melting point of the polyamide, and below the degradation temperature of the polyamide. In a particularly preferred embodiment of this invention, the polyamide is heated above the melting point of the polyamide in the mixture. An effective amount of one or more aryl phosphoryl azide compounds in liquid or powdered form, either neat or diluted with a diluent such as cyclohexane is added to the melted polyamides while at the same time vigorously stirring the melt, or added prior to melting and mixing. Heating is continued until the desired decrease in melt index and increase in viscosity has been obtained and it is thereafter coated.

In the most preferred embodiment, the polaymide components is granulated, and the granulated components are mixed with a suitable aryl phosphoryl azide compound in a suitable mixer, as for example, a tumbler or a Branbury Mixer, or the like, as uniformly as possible. Thereafter, the composition is dried in vacuum and is heated in an extruder until the polyamide is melted. As described above, the mixture is heated in the extruder until the desired decrease in melt index and/or increase in melt elasticity and/or melt viscosity has been obtained, and it is thereafter expressed with cooling. It will be appreciated that the mixing and heating of polymamides and aryl phosphoryl azide compounds may be accomplished by other conventional methods known to those skilled in the art.

The order of mixing of the various components of the intimate mixture is not critical. Accordingly, the order of addition of the polyamides, the aryl phosphoryl azide compound, and other optional components to be described in more detail hereinbelow, to form the intimate mixture, can be varied as desired.

The process of this invention is preferably carried out in the absence of air, as for example, in the presence of an inert gas, such as argon, carbon dioxide, nitrogen or the like. The process can be carried out in a batchwise or discontinuous fashion, as for example, carrying out the process in a sealed container. Alternatively, the process can be carried out in a continuous fashion in a single processing zone, as for example, by use of an extruder as described hereinabove, or in a plurality of such reaction zones, in series or parallel.

Reaction temperature can be varied over a wide range. However, it should be appreciated that the process temperature employed in any specific instance will depend on the particular polyamide employed and, in the preferred embodiments should be at least as high as the melting point of the polyamide and below the degradation temperature of the polyamides. In the preferred embodiments of this invention, the process temperature is such that the polyamide will remain in the molten state as the melt index decreases and the melt viscosity and melt elasticity increase to the desired levels. Normally, this can be accomplished in one or two ways. Either the process can be carried out at a temperature which is equal to or greater than the melting point of the desired product; or process temperatures can be increased periodically over the course of the conduct of the process so as to maintain the mixture in the molten state. In the preferred embodiments of this invention in which the homopolymers are polycaprolactam or poly(hexamethylene adipamide), the process temperature of the present invention can vary over a range between about 245° C. and about 315° C. Preferably, the process temperature should be maintained between about 265° C. and about 305° C., and most preferably the process should be carried out at a temperature of 290° C. to about 300° C. It will be appreciated that this invention and further experiments in regard to this invention have been conducted on a small laboratory scale. Therefore, it should be appreciated that if the invention were conducted on a larger industrial scale that some heat loss might occur. Consequently, an industrial practice of these preferred embodiments of present invention would possibly require that the extrusion vessel be heated to a temperature greater than about 290° C. to about 300° C. in order to obtain a reaction temperature of about 300° C.

Similarly, process pressures are not critical and can be varied widely without adversely affecting the process. Consequently, the process can be conducted at sub-atmospheric, atmospheric or super-atomspheric pressures. However, for convenience the process is carried out at atmospheric or autogenous pressure.

The process if carried out for a time sufficient to obtain the desired decrease in the melt index and increase in the melt viscosity and melt elasticity of the mixture. Reaction times can be varied over a wide range. Usually, reaction times will depend on a variety of factors such as the polymeric components, reaction temperatures, the aryl phosphoryl azide compound and its concentration, and other factors known to those of skill in the art to affect reaction times. In most instances, the reaction time can vary from a few minutes to 24 hr. or more. In the preferred embodiments of this invention, reaction times will vary from about 1 min. to about 2 hrs. and in the particularly preferred embodiments from about 2 min. to about 30 to 60 min.

Best results are obtianed when the process of this invention is carried out in the presence of as little water as possible. Ideally, the conditions will be anhydrous, and this represents the most preferred embodiment of the invention. However, good results can be obtained when as much as 0.165 wt % water based on the total weight of the mixture is present therein. In the preferred embodiments, the wt % of water is less than about 0.1 wt %, and in the particularly preferred embodiments, the wt % of water is less than about 0.05 wt % on the same basis.

Aryl phosphoryl azide compounds for use in the practice of this invention are of the formula:

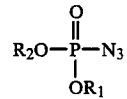

wherein $R_1$ and $R_2$ are as described above. Illustrative of useful compounds are those in which $R_1$ is an aryl substituent such as phenyl or substituted phenyl such as 2-aminophenyl, 3-aminophenyl, 2-benzyloxyphenyl, 3-benzyloxyphenyl, 4-benzyloxyphenyl, 2-bromophenyl, 3-bromo-5-chlorophenyl, 3-bromo-2,4-dimetrophenyl, 5-bromo-2-nitrophenyl, 2-butoxyphenyl, 3-chlorophenyl, 4-chloro-2,3-di-nitrophenyl, 2,4-dibromophenyl, 2,6-dichlorophenyl, 2,4-diiodophenyl, 3,5-dimethoxyphenyl, 2-ethoxyphenyl, 4-ethoxyphenyl, 2,5-dinitrophenyl, 4-heptyloxyphenyl, 4-hexyloxyphenyl, 4-methyoxyphenyl, 4-methoxy-2-nitrophenyl, 4-octyloxy phenyl, 4-propoxyphenyl, 2,3,5-trichlorophenyl, 2,3,5-triiodophenyl, 4-isobutylphenyl, 4-isopropyl-1-methylphenyl, 2-methoxy-4-propenylphenyl, 4-methyl-1,3,5-chlorophenyl, 4-pentylphenyl, 2-propylphenyl, 2,3,5,6-tetramethylphenyl, 3,5-di-tert-butylphenyl, 4-tert-butylphenyl, 3-isopropylphenyl, 2,4-dimethylphenyl, 2-methylcarbonyl phenyl and the like. The $R_2$ substitutents can vary widely and include $R_1$ substituents alkyl and substituted alkyl groups such as tert-butyl, n-butyl, isopropyl, hexyl, 2-nitropropyl, neopentyl, pentyl, sec-pentyl, ethyl, 2-chloroethyl and the like. Metal salts of the phosphoryl azide such as sodium, potassium, zinc, lithium, calcium, barium, magnesium, aluminum, lanthanium and other metal salts and/or ammonium phosphoryl azide compounds in which $R_2$ is a cation are also illustrative of useful compounds.

Preferred for use in the practice of this invention are phosphoryl azide compounds in which $R_1$ and $R_2$ are the same or different and are phenyl or substitued phenyl. In the particularly preferred embodiments of the invention, $R_1$ and $R_2$ are the same or different and are phenyl or phenyl substituted with one or more nitro, alkoxyalkyl, alkylphenyl, alkoxyphenyl, phenoxy, halo, phenyl, phenylalkyl, alkyl or alkoxy groups. Amongst these particularly preferred embodiments, most preferred are those embodiments in which $R_1$ and $R_2$ are the same and are phenyl, phenyl substituted with one or more alkyl, phenyl, phenylalkyl or alkoxy groups, with diphenyl phosphoryl azide being the phosphoryl azide compound of choice.

Phosphoryl azide compounds for use in the particularly preferred embodiments of the inventions are those in which $R_1$ and $R_2$ are the same and are phenyl or substituted phenyl wherein permissible substituents are phenyl, alkyl, alkoxy, phenyl or phenoxy.

An effective amount of one or more aryl phosphoryl azide materials is employed in forming the intimate mixture. In general, the amount of aryl phosphoryl azide compound employed is at least about 0.05 wt % based on the total weight of the mixture. In the preferred embodiments of this invention, the quantity of the one or more aryl phosphoryl azide compound employed is at least about 0.05 wt % to about 5 wt %, based on the total weight of the mixture. In the particularly preferred embodiments of this invention, the wt % of aryl phosphoryl azide compound is in the range of from about 0.1 wt % to about 2 wt %, and amongst these particularly preferred embodiments, those in which the quantity of aryl phosphoryl azide compound employed is from about 0.5 wt % to about 1 wt % based on the total weight of the mixture are most preferred.

Polymers which are useful in the conduct of this invention are polyamides. Illustrative of useful polyamides are those characterized by the presence of recurring carbonamide groups as an integral part of the polymer chain which are separated from one another by at least two carbon atoms. These polyamides are those prepared by reaction of diamines and diacids having the recurring unit represented by the general formula:

NHCORCONHR$^1$ in which R is an alkylene group of at least about two carbon atoms, preferably from about 2 to about 10 carbon atoms, and R$^1$ is R or aryl. Exemplary of such materials are poly(hexamethylene adipamide) (nylon 6,6) poly(hexamethylene sebacamide) (nylon 6,10), poly(hexamethylene isophthalamide), poly(hexamethylene terephthalamide), poly(heptamethylene pimelamide) (nylon 7,7), poly(octamethylene suberamide) (nylon 8,8), poly(nonamethylene azelamide) (nylon 9,9), poly (decamethylene azelamide) (nylon 10,9), poly(decamethylene sebacamide) (nylon 10,10), poly[bis(4-amino cyclohexyl)methane-1,10-decanecarboxamide)] (Quiana), poly(m-xylylene adipamide), poly(p-xylylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides are those formed by polymerization of amino acids and derivatives thereof, as for example lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminoocatanoic acid) (nylon 8), poly(9-aminononanoic acid)) (nylon 9), poly(10-aminodecanoic acid) (nylon 10), poly(11-aminoundecanoic acid) (nylon 11), poly(12-aminododecanoic acid) (nylon 12) and the like.

Preferred polyamides for use in the practice of this invention are polycaprolactam and poly(hexamethylene adipamide). The particularly preferred polyamide is polycaprolactam.

Various other optional ingredients, which are normally included in polymer compositions, may be added to the mixture at an appropriate time during the conduct of the process. For example, these optional ingredients can be added either prior to or after melting of the polyamides in the first step of the process of this invention; or after the conduct of the second step in which the desired melt index, melt viscosity and melt elasticity have been attained. Such optional components include fillers, plasticizers, impact modifiers, colorants, mold release satisfy agents, antioxidants, ultraviolet light stabilizers, lubricants, antistatic agents, fire retardants, and the like. These optional components are well known to those of skill in the art, accordingly, only the preferred optional components will be described herein in detail.

The modified polyamides pepared in the process of this invention preferably includes a particulate filler, which functions to increase the modulus and stiffness of the composition, and provides a more economical composition. Any conventional filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and mixtures thereof. Examples of such useful fillers include glass fibers alumina, aluminum hydrates, feldspar, asbestos, talc, calcium carbonates, clay, carbon black, glass quartz, novaculite and other forms of silica, kaolinite, bentonite, garnet, mica, saponite, beidellite, calcium oxide, calcium hydroxide, and the like such fillers are well-known materials and are readily available. The foregoing recited fillers are illustrative only and are not meant to limit the scope of the fillers that can be employed in this invention. In the preferred embodiments of this invention fibrous materials are the fillers of choice, and glass fiber is the filler of choice in the particularly preferred embodiments of this invention.

The quantity of filler employed is not critical and can be varied widely as desired. In the preferred embodiments of this inveniton, the quantity of filler is up to about 150 wt % based on the total weight of the polymer and phosphite components, and in the particularly preferred embodiment is in the range of from about 30 to about 90 wt % on the same basis.

It is also very desirable to include a plasticizer-of the type known in the art for use with polymer composition. Useful plasticizers will depend on various factors including the type of polyamides employed, and include caprolactam, mixtures of ortho and paratoluene ethyl sulfonamides, and the like.

Modified polyamides formed in accordance with this invention are useful in the fabrication of films. Films produced in accordance with this invention may be employed as packaging materials, incorporated in laminates and diffusion barrier, cooking bags, cable insulation and the like.

Such modified polyamides are extremely useful as tire cord in pneumatic tires, and the products, filaments, fibers and produced therewith have significantly better properties than other polymers. For example, the fibers have increased tenacity, greater breaking strength and greater resistance to depolymerization. When yarn produced from a modified polyamides prepared by the process of this invention is made into tire cord and the cord is then used for pneumatic tire reinforcement, the life span of the tire is markedly increased over that of tires reinforced with cord made from other polymers. Modified polyamides are thermoplastic materials from which molded articles of manufacture having valuable properties can be produced by the conventional shaping processes, such as casting, injection molding and extruding. Examples of such moldings are components for technical equipment, apparatus castings, household equipment, sports equipments, components for the electrical and electronics industries and electrically insulations, car components, circuits, fibers and semifinished products whch can be shaped by machining. the use of the materials for coating articles by means of immersion or powder coating processes is also possible as is their use as hot-melt adhesives. The polymer compositions according to the invention are outstandingly suitable for specific applications of all types since their spectrum of properties can be modified in the desired direction in manifold ways.

Compositions prepared in accordance with the process of this invention are outstandingly suitable for the production of sheets and panels having valuable properties. The sheets and panels prepared from such compositions are suitable as coating materials for other materials comprising, for example, wood, glass, ceramic, metal or other plastics, and outstanding strengths can be achieved using conventional adhesion promoters, as for example, promoters based on vinyl resins. The sheets and panels can also be laminated with other plastic films and this is preferably effected by joint extrusion, the sheets being bonded in the molten state. The surfaces of the sheets and panels, including those in the embossed form, can be improved or finished by conventional methods, as for example, by lacquering or by the application of protective films. The compositions prepared in accordance with the process of this invention can be made into films with or without fillers, which may be transparent or translucent.

The foregoing detailed description of the invention has been given for clarity of understanding only, and no unnecessary limitations are to be understood therefrom. The invention is not limited to the exact details herein shown and described, and will encompass obvious modifications which will occur to those skilled in the art in view of the appended claims.

EXAMPLE I (A) Sample Preparation: Commercial grade nylon 6 from Allied-Signal Inc. was freeze ground to an average particle size less than 2 mm in a conventional grinding mill and subsequently vacuum dried at 95° C. The polymer samples were then coated with 2% and 5% diphenylphosphorylazide (DPPA) by weight based on the weight of the polymer, respectively. A solution coating process was chosen to ensure uniformity in the dispersion of the DPPA. The coated granular resin was then dried, extruded and pelletized. The extrusion was carried out on a one inch single screw extruder, with fluted mixing sections and a die zone temperature of 280° C. The extruded strand was quenched in a water bath containing water/ice mixture and subsequently pelletized.

(B) Thermal Analysis: Differential Scanning Calorimetry (DSC) was used to obtain the thermal transitions. A Dupont 9900 thermal analyzer with a DSC cell in argon atmosphere was used. A sample of about 10 mg was crimped in an aluminum pan and heated at 10° C./min. After initial heat-up, the sample was held at 250° C. for 5 min. prior to either programmed cooling (10° C./min.) or quenching in liquid nitrogen. A subsequent reheat was carried out under the same conditions as the initial heat-up.

A parallel experiment was also run for nylon 6 itself without the addition of DPPA. The results are set forth in the following Table I:

TABLE I

| Sample | Tm °C.(upon reheat after 250° C. treatment) |
| --- | --- |
| nylon 6 (no DPPA) | 223 |
| nylon 6 (98%) + DPPA (2%) | 216 |
| nylon 6 (95%) + DPPA (5%) | 209 |

EXAMPLE II

Extrusion experiments were carried out to determine the effect of DPPA on the melting point and melt viscosity of nylon 6.

(A) Sample Preparation: Freeze ground samples of nylon 6 were coated with DPPA by dissolving DPPA in cyclohexane using approximately 10 ml of the solution per 100 g of polymer sample. DPPA concentrations were 1% and 2% of the polymer weight. The coated products were vacuum dried at room-temperature for 40 hr. to remove the cyclohexane. The dry coated powder was then melt processed in a one inch, single screw Wayne Extruder at 272° C. The extruded products were cooled in water and pelletized. Water was removed by drying in vacuum oven at 40° C. All the extruded pellets were analyzed for the thermal properties.

(B) Rheological Properties: The melting temperature, melt elasticity and melt viscosity of the various samples were determined. The melting temperature of the various samples were determined by differential scanning calorimetry (DSC). In these experiments, a Dupont 9900 Thermal Analyzer with a DSC cell in argon atmosphere was used. A sample was crimped in an aluminum pan and heated at 10° C. min. After initial heat-up, the sample was held at 250° C. for 5 min. prior to either programmed cooling (10° C./min.) or quenching in liquid nitrogen. A subsequent reheat was carried out under the same conditions as the initial heat-up.

The melt viscosity and melt elasticity measurements were made using a Rheometric Dynamic Spectrometer. In these experiments, samples for rheological measurements were dried under vacuum generally pressure lower than 0.05 mm:Hg at 95° C. for a period of 15 hr. and stored in a dry atmosphere. A Rheometric Dynamic Spectrometer was used to measure properties of the nylon melt at 260° C., namely the storage modulus (G') and the complex viscosity (nη). Measurements were made in a parallel plate geometry using the 25 mm diameter plates over a frequency (i.e. deformation rate, analogous to shear rate) range of 1–500 radians/second.

The results of these experiments are set forth in the following Table II and in FIG. 1. In Table II, Sample A is nylon 6 pellets obtained from Allied-Signal Inc. under the trade designation 8207F; Sample B is freeze ground 8207F nylon 6; Sample C is re-extruded freeze ground 8207F nylon 6; Sample D is re-extruded freeze ground 8207F nylon 6 containing 1% by weight of DPPA; and Sample E is re-extruded freeze ground 8207F nylon 6 containing 2% by weight of DPPA.

TABLE II

| Sample | Initial Heat-up (Tm) °C. | Cooling Tcc (°C.) | Reheat Tm (°C.) | Melt Viscosity (Pa.S) | Melt Elasticity (Pa) |
| --- | --- | --- | --- | --- | --- |
| A | 225.3 | 166.5 | 223 | — | — |
| B | 224.1 | 172.7 + 183 | 222.6 | — | — |
| C | 223.6 | 186.5 | 221.5 | 585 | 130 |
| D | 222.7 | 179.1 | 217 | 5290 | 49,000 |
| E | 222.4 | 177.5 | 216 | — | — |

EXAMPLE III (A) Sample Preparation: Commercial grade nylon 6 of molecular weight of 35–40,000 from Allied-Signal Inc. was freeze ground to an average particle size less than 2 mm in a conventional grinding mill and subsequently vacuum dried at 95° C. The polymer was then coated with 1% diphenylphosphorylazide (DPPA) by weight based on the weight of the polymer. Two other compositions were made in which the amount of DPPA was 0.5 and 2.0 wt %. A solution coating process was chosen to ensure uniformity in the dispersion of the DPPA. The coated granular resin was then dried, extruded and pelletized. The extrusion was carried out on a one inch single screw extruder with fluted mixing sections and a die zone temperature of 280° C. The exturded strand was quenched in a water bath containing water/ice mixture and subsequently pelletized.

(B) Melt Viscosity and Melt Elasticity Measurements: The samples for rheological measurements were dried under vacuum generally better than 0.05 mm Hg at 95° C. for a period of 15 hr. and stored in a dry atmosphere. A Rheometrics Dynamic Spectrometer was used to measure properties of the nylon melt at 260° C., namely, the storage modulus (G') and the complex viscosity ($\eta^*$). Measurements were made in a parallel plate geometry using the 25 mm diameter plates over a frequency (i.e. deformation rate, analogous to shear rate) range of 1–500 radians/second.

(C) Melt Temperature Measurement: The melting points of the extruded samples and a control sample of nylon 6 which did not contain DPPA where determined by differential scanning calorimetry. In these experiments a DuPont Differential Scanning Calorimetery (DSC) was used in argon atmosphere. A sample of about 10 mg was crimped in an aluminum pan and heated at 10° C./min. After the initial heat-up, the samples were heated to 280° C. and held at that temperature for 5 min.

The results of these experiments are set forth in the following Table III. In Table III, Sample A is nylon 6 obtained from Allied-Signal Inc under the trade designation 8207F; Sample B is nylon 6 containing 0.5 wt % of DPPA; Sample C is nylon 6 containing 1 wt % of DPPA; Sample D is nylon 6 containing 2% DPPA.

TABLE III

| Sample D | Melt Viscosity* (Pa.S) | Melt Elasticity** (Pa) | Melt Temperature (°C.) |
|---|---|---|---|
| A | 585 | 130 | 222 |
| B | 1,600 | — | — |
| C | 5,290 | 49,000 | 217 |
| D | —*** | — | 216 |

*At 260° C. and 12 seconds$^{-1}$ shear rate.
**At 260° C. and 5 Rad/seconds frequency.
***Viscosity too high to measure.

The results clearly show that DPPA is very effective in enhancing the melt viscosity and the melt elasticity and depressing the melt temperature. A higher melt elasticity is helpful for high temperature exposure while a lower melt temperature can be helpful for processing.

What is claimed is:

1. A process for improving the properties of a polyamide which comprises the steps of:
   (a) forming an intimate mixture of a polyamide and an effective amount of one or more aryl phosphoryl azide compounds of the formula:

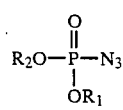

wherein:
   $R_1$ is selected from the group consisting of phenyl or phenyl substituted with one or more substituents which are inert under process conditions; and
   $R_2$ is selected from the group consisting of $R_1$ substituents, haloalkyl, alkyl, a metal or non-metal cation and hydrogen; and
   (b) heating said mixture for a period of time and at a temperature sufficient to decrease the melt index and increase the melt viscosity and melt elasticity of said polyamide.

2. A process according to claim 1 wherein said mixture is a molten mixture.

3. A process according to claim 2 wherein said polyamide is poly caprolactam.

4. A process according to claim 2 wherein said polyamide is polyhexamethylene adipamide.

5. A process according to claim 4 wherein said mixture is heated at a temperature of from 265° C. to about 315° C.

6. A process according to claim 5 wherein said heating is conducted in two stages, the first of which is at a temperature from about 265° C. to about 315° C., and the second of which is at a temperature of from about 240° C. and about 315° C.

7. A process according to claim 6 wherein said first and second stages are conducted at temperatures from about 295° C. to about 305° C.

8. A process according to claim 1 wherein said mixture is heated for a period of time of from about 2 to about 20 minutes.

9. A process according to claim 8 wherein said period of time is from about 2 to about 10 minutes.

10. A process according to claim 1 which further comprises the steps of:
    (c) adding one or more phosphite compounds to said heated mixture; and
    (d) heating said mixture for a period of time sufficient to increase the molecular weight of said polyamide to the desired extent.

11. A process according to claim 1 wherein the amount of said aryl phosphoryl azide compound is at least about 0.05 wt % based on the total weight of the mixture.

12. A process according to claim 11 wherein said amount is from about 0.05 to about 10 wt %.

13. A process according to claim 12 wherein said amount is from about 0.5 to about 10 wt %.

14. A process according to claim 13 wherein said amount is from about 0.2 to about 2 wt %.

15. A process according to claim 1 wherein $R_1$ and $R_2$ are the same or different and are phenyl or substituted phenyl.

16. A process according to claim 15 wherein $R_1$ and $R_2$ and the same or different and are phenyl or phenyl substituted with one or more alkyl, halo, nitro, phenyl, phenoxy, alkylphenyl, alkoxyphenyl, alkoxyalkyl, phenylalkyl or alkoxy groups.

17. A process according to claim 16 wherein $R_1$ and $R_2$ are the same or different and are phenyl or phenyl substituted with one or more phenyl, alkyl, alkoxy or phenylalkyl groups.

18. A process according to claim 17 wherein $R_1$ and $R_2$ are the same or different and are phenyl or phenyl substituted with one or more alkyl or alkoxy groups.

19. A process according to claim 1 wherein said mixture is heated in the absence or substantial absence of water.

* * * * *